United States Patent
Tan et al.

(10) Patent No.: US 11,038,871 B2
(45) Date of Patent: Jun. 15, 2021

(54) TWO-STEP AUTHENTICATION USING PUSH TO TALK

(71) Applicant: MOTOROLA SOLUTIONS, INC, Chicago, IL (US)

(72) Inventors: Woei Chyuan Tan, Bayan Lepas (MY); Mohamad Adib Osman, Sungai Petani (MY); Carmen Jia Yi Siau, Kota Kinabalu (MY); Choon Cheng Tan, Permatang Pauh (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 220 days.

(21) Appl. No.: 16/019,586

(22) Filed: Jun. 27, 2018

(65) Prior Publication Data

US 2020/0007523 A1    Jan. 2, 2020

(51) Int. Cl.
| | |
|---|---|
| *H04L 29/06* | (2006.01) |
| *H04W 76/45* | (2018.01) |
| *H04W 4/10* | (2009.01) |
| *G06F 21/40* | (2013.01) |
| *H04W 4/08* | (2009.01) |

(52) U.S. Cl.
CPC ............ *H04L 63/083* (2013.01); *G06F 21/40* (2013.01); *H04W 4/10* (2013.01); *H04W 76/45* (2018.02); *H04W 4/08* (2013.01)

(58) Field of Classification Search
CPC ...... H04L 63/083; H04W 76/45; H04W 4/10; H04W 4/08; G06F 21/40; G06F 21/31; G06F 21/33; G06F 3/0481; G06F 3/0484; G06F 19/00; G06F 21/32; G06F 21/34; G06F 2221/2111; G06F 3/04842; G06F 3/04847; G06F 13/102; G06F 13/4282; G06F 21/30; G06F 21/316; G06F 21/41; G06F 21/44; G06F 21/6218; G06F 21/6245; G06F 21/77; G06F 21/85; G06F 21/88

See application file for complete search history.

(56) References Cited

U.S. PATENT DOCUMENTS

| | | | |
|---|---|---|---|
| 7,809,842 B2 | 10/2010 | Moran et al. | |
| 7,970,351 B2 * | 6/2011 | Jabara | H04W 4/02 455/41.2 |
| 2004/0202117 A1 | 10/2004 | Wilson et al. | |
| 2005/0215233 A1 * | 9/2005 | Perera | H04W 12/06 455/411 |
| 2007/0239824 A1 | 10/2007 | Shaffer et al. | |
| 2008/0200198 A1 * | 8/2008 | Zhang | H04W 4/10 455/518 |
| 2012/0200419 A1 * | 8/2012 | Nylund | H04L 67/18 340/686.1 |

(Continued)

OTHER PUBLICATIONS

"User based voice/data call pre-emption for Astro/P25 systems" IP.COM Journal, IP.COM INC., West Henrietta, NY, US, Dec. 22, 2010 (Dec. 22, 2010), XP013141844, ISSN: 1533-0001 p. 2-3.

(Continued)

*Primary Examiner* — Carl G Colin
*Assistant Examiner* — Andrew Suh

(57) ABSTRACT

A method and apparatus for providing two-step authentication is provided herein. During operation, the two parts of authentication comprise (1) something a user knows, for example, a password; and (2) a push-to-talk (PTT) communication over a predetermined talkgroup.

9 Claims, 4 Drawing Sheets

(56) References Cited

U.S. PATENT DOCUMENTS

| | | | | |
|---|---|---|---|---|
| 2013/0024688 A1* | 1/2013 | Wen | .................... | H04L 63/0807 |
| | | | | 713/168 |
| 2014/0031019 A1* | 1/2014 | Qi | .......................... | H04W 4/00 |
| | | | | 455/416 |
| 2014/0094119 A1* | 4/2014 | Stojanovski | .......... | H04L 1/1864 |
| | | | | 455/41.1 |
| 2016/0105778 A1* | 4/2016 | Szyszka | ................ | H04L 63/065 |
| | | | | 455/519 |
| 2016/0135229 A1 | 5/2016 | Swierczynski et al. | | |
| 2016/0183066 A1* | 6/2016 | Chandler | ................ | H04W 4/10 |
| | | | | 455/518 |
| 2017/0124307 A1* | 5/2017 | Reitsma | ................ | G06F 3/0481 |
| 2018/0227627 A1* | 8/2018 | Jabara | ................... | H04W 12/03 |
| 2018/0248863 A1* | 8/2018 | Kao | ....................... | H04W 12/06 |
| 2019/0082304 A1* | 3/2019 | Bestor | ............... | G06F 16/90332 |
| 2019/0121497 A1* | 4/2019 | Tov | ........................ | H04L 41/22 |

OTHER PUBLICATIONS

The International Search Report and the Written Opinion corresponding patent serial No. PCT/US2019/038405 filed Jun. 21, 2019, dated Sep. 5, 2019, all pages.

* cited by examiner

TWO-STEP AUTHENTICATION USING PUSH TO TALK

BACKGROUND OF THE INVENTION

Two-step verification or two-step authentication is a method of confirming a user's claimed identity by utilizing something they know (i.e., a password) and a second factor other than something they have or something they are. An example of a second step is the user repeating back something that was sent to them through an out-of-band mechanism.

Mobile-device two-step authentication involving devices such as radios, mobile phones, and smartphones was developed to provide two-step verification. To authenticate themselves, people can use their personal access-codes to the device (i.e. something that only the individual user knows, for example, a password) plus a one-time-valid, dynamic passcode, typically consisting of 4 to 6 digits. The passcode can be sent to their mobile device via a text message (e.g., short-message service (SMS)). As of 2018 SMS is the most broadly-adopted multi-factor authentication method for consumer-facing accounts. Notwithstanding the popularity of SMS verification, the United States National Institute of Standards and Technology (NIST) has condemned SMS verification as a form of authentication, and security advocates have publicly criticized it. Thus, a need exists for a better, more-secure form of two-step authentication.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
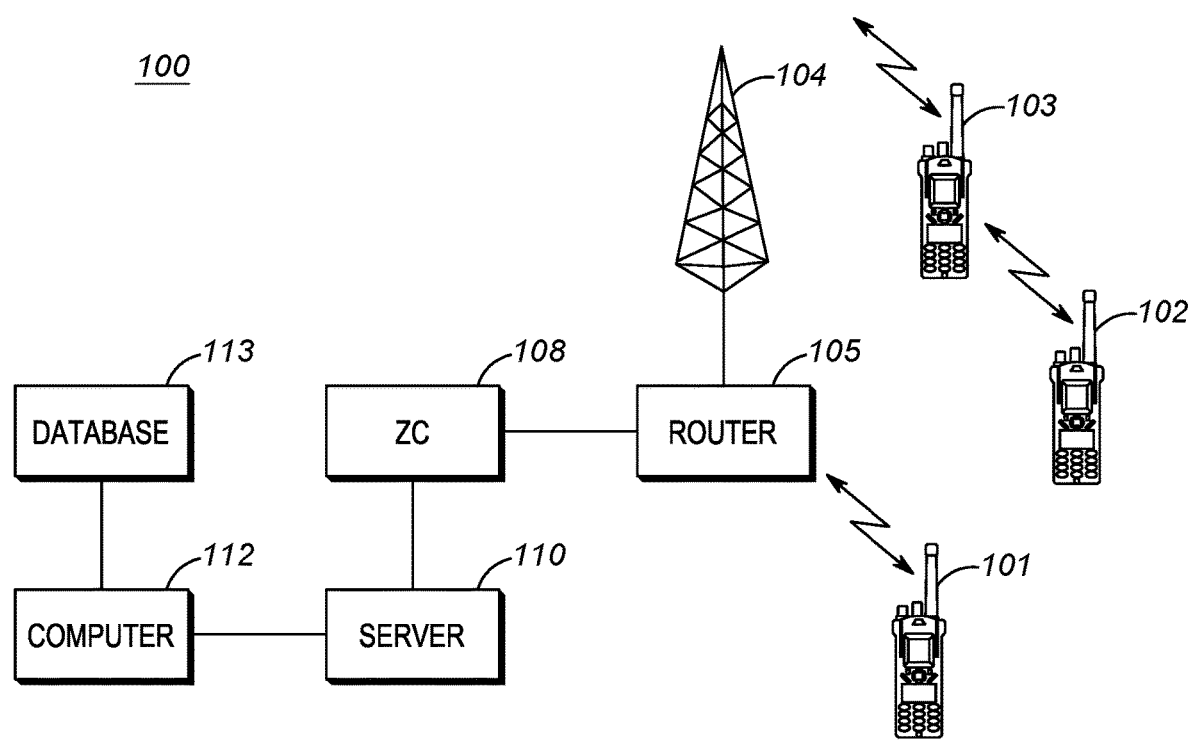
FIG. 1 illustrates a general operating environment for the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above mentioned need, a method and apparatus for providing two-step authentication is provided herein. During operation, the two parts of authentication comprise (1) something a user knows, for example, a password; and (2) a push-to-talk (PTT) communication over a predetermined talkgroup.

Expanding on the above, once a user's correct "password" has been received, a verification server will instruct the user to key their radio utilizing a particular talkgroup. If reception is received from the user's radio over the particular talkgroup, the user is authenticated. Thus, the two parts of authentication comprise a system:

receiving something a user knows, such as a user's correct password; and receiving a communication from a user's radio over a particular talkgroup.

In a further embodiment of the present invention, the user's radio will not be capable of communicating over the particular talkgroup unless programmed to communicate over the particular talkgroup only after receiving the something the user knows (e.g., the password). More specifically, the user's radio will originally not have the capability to communicate over the particular talkgroup, however, as part of the second step of authentication, the server may cause the radio to have the capabilities to communicate over the particular talkgroup. Once appropriately programmed, the server will await a predetermined period of time for the radio to communicate over the particular talkgroup. Once the predetermined time has passed, the server will cause the radio to remove the ability to communicate over the particular talkgroup. The particular talk group will be referred to below as AUTH_TG.

As an example of the above, assume Officer Fred wishes to gain access to their police department email server. As part of the authentication process, Officer Fred will be asked to provide a password, or fingerprint, . . . , etc. Once provided, a second part of the authentication process takes place. As discussed, the authentication server will cause Officer Fred's radio to be programmed to transmit/receive on AUTH_TG. Instructions will be given to Officer Fred to key their radio to cause it to transmit over AUTH_TG. Once reception of a communication by Officer Fred's radio, over AUTH_TG takes place, then the second part of the two-part authentication has been accomplished, and access is granted to Officer Fred's email server.

The above-described technique for providing two-part authentication has added security over simply providing an authentication code over SMS. For example, because police radio transmissions can only be received in a certain geographic area, anyone attempting to gain fraudulent access to a system will need to be near the communication system so that an over-the-air transmission on AUTH_TG can be received. This prevents individuals from around the world attempting to gain access.

In order to further increase security, the system can periodically change the talkgroup associated with AUTH_TG. For example, the talkgroup associated with AUTH_TG may be associated with channel 23, talkgroup 13, but after a period of time, the talkgroup associated with AUTH_TG may be changed to channel 23, talkgroup 42. Thus, the talkgroup associated with AUTH_TG may change daily, hourly, . . . , etc.

In order to further increase security, a passcode may be provided (e.g., audibly) to the user over AUTH_TG. The successful replication of the passcode may be required for the second part of the two-part authentication process.

In one embodiment, a server will cause the radio to communicate on AUTH_TG by having equipment send a regroup command to the radio. For example, upon a computer requesting a second part of the authentication process be carried out, the server can determine an identity of a user's radio, regroup the radio to include the AUTH_TG, send the user a notification to transmit over AUTH_TG, and await reception from the radio over AUTH_TG. If reception is received from the radio within a predetermined period of time over AUTH_TG, the server will authenticate the user. After authentication takes place (or after the predetermined time period) the user's radio may again be programed to remove the ability to communicate over AUTH_TG.

It should be noted that AUTH_TG is preferably not assigned to a user of the system until that user needs to be authenticated. Therefore, AUTH_TG may be thought of as reserved, known, and unassigned.

FIG. 1 illustrates a general operating environment for the present invention. In a two-way radio system such as system 100, each radio typically communicates with one group of radios (talk group) at a time. For example, a firefighter may be affiliated with or using a firefighter talk group and a police officer may be affiliated with or using a police talk group. A conventional traffic channel may be limited to a particular number of talk groups. For example, an ASTRO25 communication system from Motorola Solutions, Inc. can employ up 20 talk groups on a single traffic channel (transmit frequency).

As shown, several radios (subscriber units) 101-103 are shown in communication with base station 104. Radios 101-103 can be any portable electronic device that is associated with a particular person, including but not limited to a standalone two-way radios, a display or monitor, a handheld computer, a tablet computer, a mobile phone, a police radio, a media player, a personal digital assistant (PDA), a GPS receiver, or the like, including a combination of two or more of these items. Each radio 101-103 may transmit and receive over a particular channel using any number of talk groups. Any transmission by radios 101-103 will at least include a talk group identifier and a radio identifier. As discussed, that talk group identifier will identify a particular talk group associated with the transmission, while the radio identifier uniquely identifies the radio making the transmission.

Still referring to FIG. 1, in an exemplary embodiment, system 100 includes at least one zone controller 108 and at least one site (base station) 104. The zone controller 108 generally represents a server or another computing device that is communicatively coupled to router 105 (e.g., via a direct physical interface, a wireless interface, a computer network or another communications network) and provides centralized control and/or management of one or more zones within the system 100. In this regard, a zone managed or otherwise controlled by the zone controller 108 should be understood as referring to a portion of a geographic coverage area of system 100 that corresponds to one or more base stations 104 associated with zone controller 108. Base station 104 generally represents the transceivers, amplifiers, antennas, controllers, and/or other hardware configured to transmit, repeat, and/or receive radio frequency signals and convert received radio frequency signals to and/or from baseband signals for transmission to and/or from the zone controller 108.

Router (or gateway) 105 preferably comprises a device that forwards transmissions received from at least base station 104 to an appropriate zone controller 108. In one embodiment of the present invention, router 105 comprises a Conventional Channel Gateway (CCGW) from Motorola Solutions, Inc.

Server 110 is configured to act as a communications client of base station 104. In addition, server 110 provides administrative control radios 101-103 so that server 110 may update operational parameters of radios 101-103. Such operational parameters include programming radios 101-103 with talk groups to use for particular channels as well as programming radios 101-103 to remove talkgroups from radios 101-103. This programming will preferably take place via a dynamic regrouping as known in the art. With the dynamic regrouping feature, server 110 may notify radios remotely redirect individual radios 101-103 to a talk group (e.g., AUTH_TG), without any intervention from radio operators.

It should be noted that voice transmissions by radios will have the talkgroup ID and unit ID embedded in it (a user is associated with their unit ID). Thus, as known in the art, any radio transmission will uniquely identify the radio along with the talkgroup of the transmission.

Finally, computer 112 represents any electronic device that gives access based on a two-part authentication process. More particularly, computer 112 may comprise another server that gives access to various data based on a two-part authentication process. For example, computer 112 may grant access to database 113 when both parts of a two-part authentication process have been successfully navigated. With the above in mind, computer 112 may comprise an email server that provides access to email stored on database 113, computer 112 may comprise a banking server that provides access to account data stored on database 113, computer 112 may be a crime-records server that provides access to crime data stored in database 113, . . . , etc. Database 113 may exist internal to computer 112, or may exist remote from computer 112.

During operation, computer 112 will give access to database 113 only upon successful two-part authentication by a user. Therefore, computer 112 will request information that is known by a user during a first part of the authentication process. This information may comprise, for example, a password, a fingerprint, a face identification, . . . , etc. Once correct information is provided, the second part of the two-part authentication process takes place.

Computer 112 will comprise data that associates an individual with a particular radio. As discussed above, each radio 101-103 will have a unique identification and be associated with a particular user. This information can be stored in table form, as shown in Table 1, below.

TABLE 1

| Illustrates how radios are mapped to various user IDs | |
| --- | --- |
| USER ID | RADIO ID |
| Joe.Adams | 1023943 |
| Fred.Avilla | 2303481 |
| . . . | . . . |
| Jamie.Zunga | 10248345 |

As part of the first part of the two-part authentication, a user may be asked for their user identification. Once the first part of the two-part authentication is successfully navigated by the user, computer 112 will associate the user identification to a radio identification (i.e., the radio associated with the user). The radio identification will be provided to server 110. A passcode may be generated by computer 112 and provided to server 110 as well.

Server 110 then causes the radio associated with the user to be reprogrammed to facilitate communication over AUTH_TG. As discussed above, AUTH_TG is a reserved talkgroup on a particular channel (e.g., channel 23, talkgroup 44). Audible instructions may be provided for the user to transmit over AUTH_TG. The passcode may be provided to the user over AUTH_TG. Any transmission over AUTH_TG from the user's radio is routed to server 110. Server 110 will wait a predetermined amount of time to determine if any such transmission was received, and if so, notify computer of such. After a predetermined period of time, or after transmissions over AUTH_TG were received, server 110 will cause the radio to be reprogrammed, removing the ability to communicate over AUTH_TG.

Once computer 112 receives notification that communication has been received over AUTH_TG from the radio associated with the user, the second part of the two-part authentication will be successful, and access to database 113 will be granted. If a passcode is being utilized, computer 112 may request the passcode prior to authentication.

Figure 2:
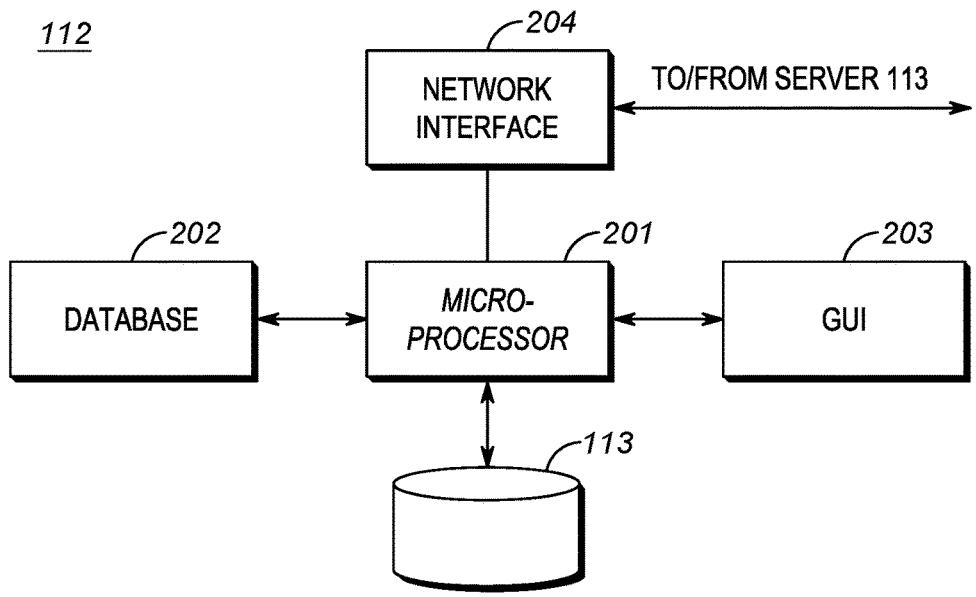
FIG. 2 is a block diagram of the computer of FIG. 1.

FIG. 2 is a block diagram of computer 112. As shown, computer 112 comprises processor (logic circuitry) 201, Database (Table) 202, Graphical-User Interface (GUI) 203, and network interface 204.

Graphical-User Interface (GUI) 203 provides a man/machine interface for receiving an input from a user and displaying information. For example, GUI 203 may provide a way of conveying (e.g., displaying) information received from computer 112. GUI 203 also provides a mechanism to receive a first part of the two-part authentication process. In order to provide the above features (and additional features), GUI 203 may comprise any combination of a touch screen, a computer screen, a keyboard, a fingerprint scanner, or any other interface needed to receive a user input and provide information to the user.

Database 202 comprises standard memory (such as RAM, ROM, . . . , etc) and serves to store user identifications and their associated passwords and radio identifications.

Logic circuitry 201 comprises a digital signal processor (DSP), general purpose microprocessor, a programmable logic device, or application specific integrated circuit (ASIC) and is configured to serve as a means for facilitating two-part authentication for access to database 113.

Network interface 204 includes elements including processing, modulating, and transceiver elements that are operable in accordance with any one or more standard or proprietary wireless interfaces, wherein some of the functionality of the processing, modulating, and transceiver elements may be performed by means of the processing device 201 through programmed logic such as software applications or firmware stored on the storage component 202 (standard random access memory) or through hardware. Examples of network interfaces (wired or wireless) include Ethernet, T1, USB interfaces, IEEE 802.11b, IEEE 802.11g, etc.

During operation, logic circuitry 201 receives a user name from a user, through GUI 203. Logic circuitry 201 also receives something the user knows (i.e., a password) from GUI 203. Logic circuitry then determines if the "password" is correct for the user name. This step comprises a first part of the two-part authentication process. More particularly, database 202 may store user name/password combinations for all users that may access database 113. Logic circuitry 201 may access database 202 in order to determine if the username/password combination is valid. If so, the first part of the two-part authentication process has passed.

Once the first part of the two-part authentication process has passed, logic circuitry accesses database 202 to determine a particular PTT radio used by the user associated with the user name. this information is sent to network interface 204 and ultimately to server 110. This causes server 110 to dynamically regroup the particular PTT radio to gain access to AUTH_TG, and wait for communications over AUTH_TG. Once a communication over AUTH_TG has been received by the particular PTT radio, notification of such is provided to logic circuitry 201, and the second part of the two-part authentication process has been passed. Access is then given to database 113.

It should be noted that if a passcode was provided to the user of the particular PTT radio, then logic circuitry 201 will only gain access to database 113 once the passcode has been received by GUI 203. The passcode may have been generated by logic circuitry 201 and provided to server 110, or alternatively, may have been generated by server 110 and then provided to logic circuitry 201. Regardless, if this added step is taken, the passcode received from GUI 203 must match the generated passcode for the second part of the two-part authentication process to be successful.

As is evident, the device of FIG. 2 provides for an apparatus for facilitating two-part authentication. During operation, a graphical user interface configured to receive a first part of a two-part authentication process and output the first part of the two-part authentication process to logic circuitry. Logic circuitry is configured to receive the first part of the two-part authentication process, and receive a second part of the two-part authentication process, wherein the second part of the two-part authentication process comprises an indication that a communication was received from a particular radio over a particular talkgroup. As discussed above, the indication that a communication was received from the particular radio over the particular talkgroup (AUTH_TG) is received from server 110. The logic circuitry is configured to grant access to information based on the received first part and second part of the two-part authentication process.

As discussed above, a network interface is provided that is configured to output a user name and/or a radio identification, causing network equipment to reprogram the radio to facilitate communication over a particular talkgroup. The first part of the two-part authentication process may comprise a user name and a password, and the logic circuitry grants access when a correct user-name/password combination has been received (i.e., matches the user-name/password combination stored in memory 202) and the communication has been received by the particular radio over the particular talkgroup.

Figure 3:
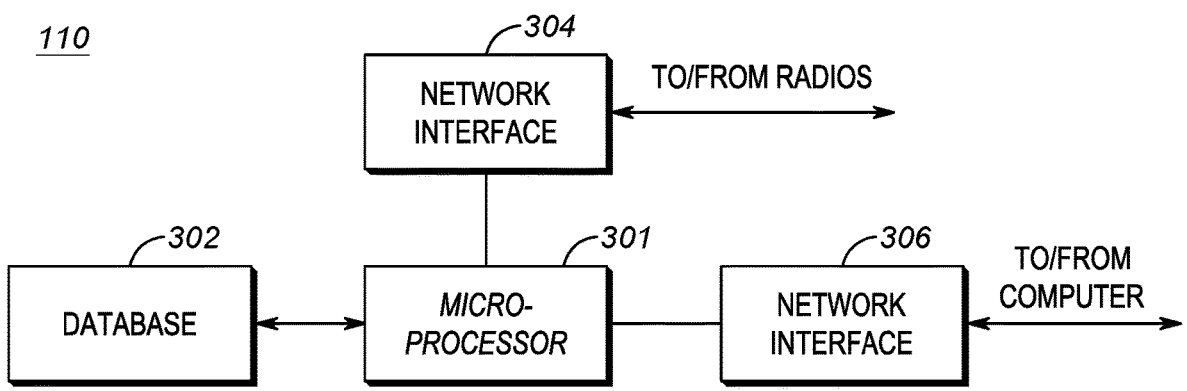
FIG. 3 is a block diagram of the server of FIG. 1.

FIG. 3 is a block diagram of the server of FIG. 1. As shown, server 110 comprises database 302, logic circuitry 301, and multiple network interfaces 304 and 306. The components of server 110 are similar to those described above with reference to FIG. 2.

During operation network interface 306 receives a radio identification from computer 112. Alternatively, network interface 306 may simply receive a user identification from computer 112 (e.g., a user name), and logic circuitry 301 may access database do determine a radio identification based on the user identification. In other words, database 302 may store user name/radio identification pairings for use in the two-step authentication process.

Once processor 301 knows the radio identification, processor 301 accesses database 202 to determine a particular talkgroup reserved for two-step authentication (AUTH_TG). Logic circuitry 301 then outputs the appropriate regrouping commands to network interface 304 to regroup (re-program) the particular radio so that it is capable of communication over AUTH_TG. As is evident, network interface 304 is appropriately coupled to zone controller 108 so that messaging can be sent to the appropriate radio.

Logic circuitry 301 then determines if a communication from the particular radio over AUTH_TG has been received at network interface 304. If so, logic circuitry provides an indication that such communication has been received. Logic circuitry 301 then dynamically regroups the particular radio to remove AUTH_TG from the radio.

It should be noted that server 110 is part of the group able to communicate on AUTH_TG. In this particular case, the "group" comprises only two devices, namely server 110 and the user's radio.

It should be noted that in the above description, all communications over talkgroups by radios comprises a wireless radio-frequency (RF) communication, such that radios communication via over-the-air communication over a particular talkgroup. It should also be noted that a "communication" from a radio over AUTH_TG may simply be any transmission received over AUTH_TG, even a simple keying of a microphone, with no other voice or data transmission (i.e., the received communication comprises an un-modulated carrier signal with no data or voice). In other words, sinusoidal signal that is used in the modulation is known as the carrier signal, or simply "the carrier". The signal that is used in modulating the carrier signal (or sinusoidal signal) is known as the "data signal" or the "message signal". It is important to notice that a simple sinusoidal carrier contains no information of its own, and the reception of which may be used as a second part of a two-part authentication scheme.

However, in alternate embodiments, a "verbal password" may be used. The verbal password may comprise information modulated on the carrier signal, for example, the utterance of specific words, for example, "allow access", "hello", . . . , etc. So for example, in a first embodiment, the second part of the two-part authentication scheme may comprise tuning to AUTH_TG and keying a microphone by pushing the PTT button on a radio. In a second embodiment the second part of the two-part authentication scheme may comprise tuning to AUTH_TG and keying a microphone by pushing the PTT button on a radio and uttering a particular phrase.

Figure 4:
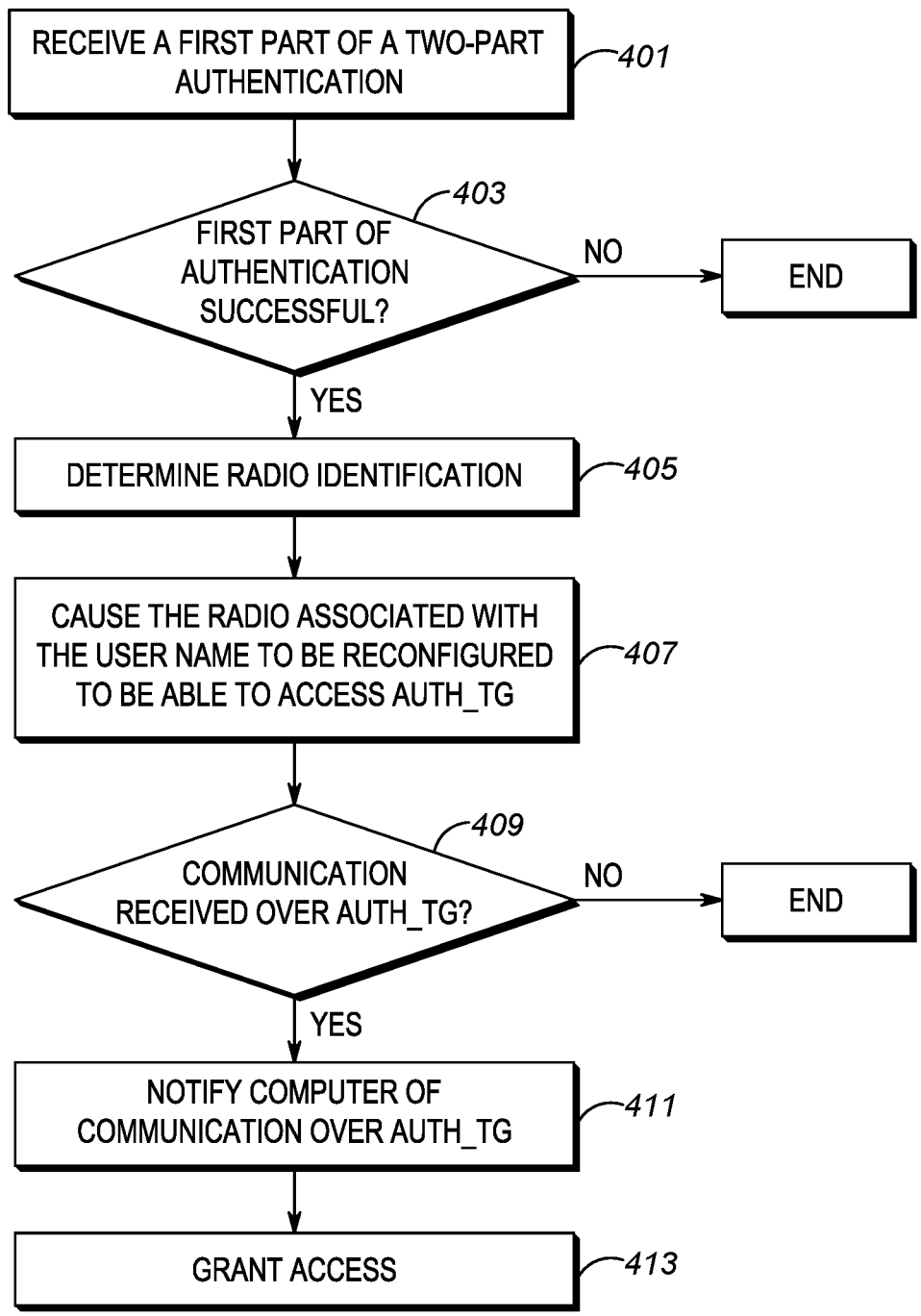
FIG. 4 is a flow chart showing operation of the system of FIG. 1.

FIG. 4 is a flow chart showing operation of the system of FIG. 1. The logic flow begins at step 401 where GUI 203 receives a first part of a two-part authentication. For example, at step 401, GUI 203 may receive a user name and a password combination. At step 403, the first part (e.g., a username and password) is passed to logic circuitry 201, and logic circuitry 201 determines if a valid password has been received for the particular user name. If, at step 403 a valid password has been provided for the user name, then the first part of the two-part authentication process has been successful, and the logic circuitry proceeds to step 405 where logic circuitry 201 determines a radio identification associated with the user name and provides the radio identification to server 110 (via network interfaces 204 and 304).

At step 407 microprocessor 301 causes the radio associated with the user name to be reconfigured to be able to access AUTH_TG. The logic flow then continues to step 409 where logic circuitry 301 determines if a communication was received from the radio associated with the user over AUTH_TG. If so, notification is given to computer 112 via network interface 306 (step 411). Finally, at step 413, the second part of the two-part authentication process is successful and access is granted.

The above logic flow provides for a system comprising a computer configured to receive a user name, receive a password, and use the user name and password as a first part of a two-part authentication process. Network equipment 110 is provided and configured to receive a radio identification, cause a radio associated with the radio identification to be reprogrammed to facilitate communication over a particular talkgroup, and receive an indication that the radio has communicated over the particular talkgroup.

As discussed, the computer is further configured to use an indication of the communication over the particular talkgroup as a second part of the two-part authentication process.

The radio may then be reconfigured/reprogrammed to remove the ability to communicate over the particular talkgroup. Also, the network equipment may be further configured to change the particular talkgroup (AUTH_TG) over time.

Figure 5:
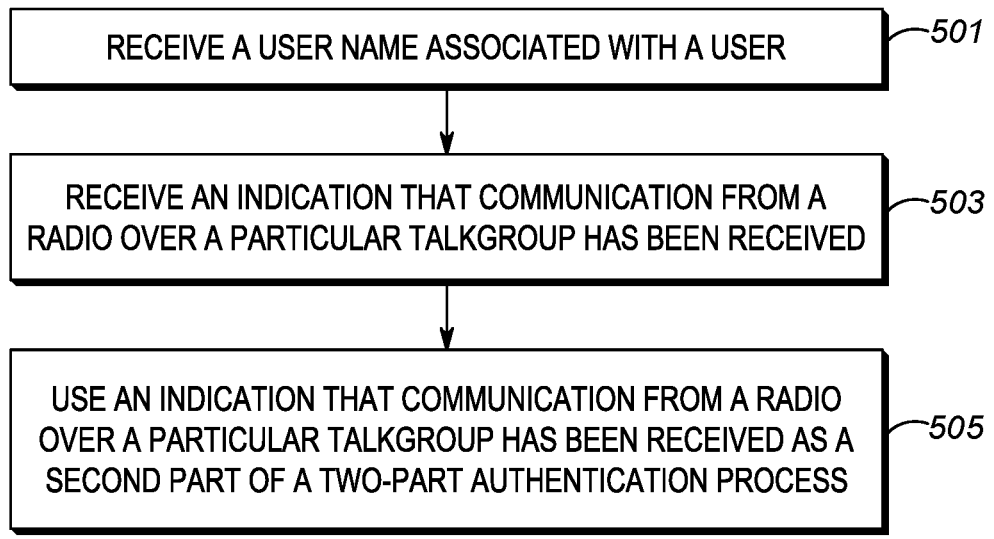
FIG. 5 is a flow chart showing operation of the computer of FIG. 1.

FIG. 5 is a flow chart showing operation of the computer of FIG. 1. The logic flow begins at step 501 where GUI 203/logic circuitry 201 receives a user name associated with a user. At step 503 logic circuitry 201 receives an indication that communication from a radio over a particular talkgroup has been received, and uses the fact that the radio has communicated over the particular talkgroup as a second part of a two-part authentication process (step 505). In other words, the second part of the two-part authentication is based on the fact that the radio has communicated over the particular talkgroup.

As discussed above, the radio is reprogrammed by server 110 to facilitate communication over a particular talkgroup by dynamically regrouping the radio. The radio may also be reprogrammed by server 110 remove the ability to communicate over the particular talkgroup.

In the foregoing specification, specific embodiments have been described. However, one of ordinary skill in the art appreciates that various modifications and changes can be made without departing from the scope of the invention as set forth in the claims below. For example, in alternate embodiments the device performing the two-part authentication may be embodied within the public-safety core network, or more computing devices in a cloud compute cluster (not shown), or some other communication device not illustrated, and/or may be a distributed among devices spanning across two or more entities. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus for facilitating two-part authentication, the apparatus comprising: a graphical user interface configured to receive a first part of a two-part authentication process and output the first part of the two-part authentication process; logic circuitry configured to:
   receive the first part of the two-part authentication process;
   reprogram a radio to communicate over a particular talkgroup (AUTH_TG) based on the first part of the two-part authentication being received;
   receive a second part of the two-part authentication process, wherein the second part of the two-part authentication process comprises an indication that a communication was received from the radio over AUTH_TG;
   grant access to information based on the received first part and second part of the two-part authentication process; and
   reprogram the radio to prevent communication over AUTH_TG after the second part of the two-part authentication process has been received.

2. The apparatus of claim 1 wherein the first part of the two-part authentication process comprises a user name and a password.

3. The apparatus of claim 1 wherein the logic circuitry grants access when:
   a correct user-name/password combination has been received; and
   a communication has been received by the particular radio over the particular talkgroup.

4. The apparatus of claim 1 wherein the second part of the two-part authentication process comprises receiving a passcode over AUTH_TG.

5. A method comprising the steps of:
   receiving a first part of a two-part authentication process, the first part of the two-part authentication process comprising a user name associated with a user;
   configuring a radio associated with the user to communicate over a particular talkgroup (AUTHTG) based on the first part of the two-part authentication being received;
   receiving a second part of the two-part authentication process by receiving an indication that communication from the radio over AUTH_TG has been received;
   granting access to information based on receiving the first part and the second part of the two- part authentication process; and
   configuring the radio to prevent communication over AUTH_TG after the first and the second parts of the two-part authentication process has been received.

6. The method of claim 5 further comprising the step of:
   receiving a password; and
   wherein the user name and password are used for the first part of the two-part authentication process.

7. The method of claim 5 wherein AUTH_TG is changed over time.

8. A system comprising:
a computer configured to receive a first part of a two-part authentication process comprising a user name and a password;
network equipment configured to cause a radio to be reprogrammed to facilitate communication over a particular talkgroup (AUTHTG) based on the first part of the two-part authentication process being received;
the network equipment configured to receive a second part of the two-part authentication process, wherein the second part of the two-part authentication process comprises an indication that the radio has communicated over the particular talkgroup;
the computer further configured grant access to information based on the first part and the second part of the two-part authentication process being received; and
the network equipment configured to cause the radio to be reprogrammed to prevent communication over AUTH_TG after the second part of the two-part authentication has been received.

9. The system of claim 8 wherein the network equipment is further configured to change AUTH_TG talkgroup over time.

* * * * *